(12) United States Patent
Sommer et al.

(10) Patent No.: US 10,124,660 B2
(45) Date of Patent: Nov. 13, 2018

(54) WORK MACHINE HAVING AN ELECTRIC DRIVE

(71) Applicant: Liebherr-Components Biberach GmbH, Biberach an der Riss (DE)

(72) Inventors: Bernd Sommer, Biberach an der Riss (DE); Christian Fehrensen, Biberach an der Riss (DE); Markus Merkle, Munderkingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 250 days.

(21) Appl. No.: 15/029,095

(22) PCT Filed: Sep. 9, 2014

(86) PCT No.: PCT/EP2014/002438
§ 371 (c)(1),
(2) Date: Apr. 13, 2016

(87) PCT Pub. No.: WO2015/055267
PCT Pub. Date: Apr. 23, 2015

(65) Prior Publication Data
US 2016/0257188 A1 Sep. 8, 2016

(30) Foreign Application Priority Data

Oct. 15, 2013 (DE) .......................... 10 2013 017 112
Dec. 19, 2013 (DE) .......................... 10 2013 021 606

(51) Int. Cl.
*B60K 6/22* (2007.10)
*B60K 6/44* (2007.10)
(Continued)

(52) U.S. Cl.
CPC .................. *B60K 6/22* (2013.01); *B60K 6/44* (2013.01); *B60K 6/46* (2013.01); *B60K 28/12* (2013.01);
(Continued)

(58) Field of Classification Search
CPC ....................................................... B60K 6/22
(Continued)

(56) References Cited

U.S. PATENT DOCUMENTS 6,793,510 B2  9/2004  Yamakawa et al.
7,508,097 B2  3/2009  Furuta et al.
(Continued)

FOREIGN PATENT DOCUMENTS

CH           77697 A      5/1918
CN      102596615 A      7/2012
(Continued)

OTHER PUBLICATIONS

State Intellectual Property Office of the People's Republic of China, Office Action and Search Report Issued in Application No. 201480056645.5, dated Mar. 15, 2017, 19 pages.
(Continued)

*Primary Examiner* — Joseph Chang
(74) *Attorney, Agent, or Firm* — McCoy Russell LLP (57) ABSTRACT

The present invention relates to a work machine, in particular to a construction machine and/or mining machine such as a crawler-type vehicle, a dump truck, mining device or the like, having an electric drive which comprises power electronics which have at least one transformer which has power connections covered by a cover for connecting power cables, wherein a manually actuable grounding device is provided for the all-pole grounding of the transformer and/or for short-circuiting an intermediate circuit connected thereto. The invention in this respect in particular also relates to such
(Continued)

a transformer. In accordance with the invention, the manually actuable grounding device is coupled to a cover latch of the cover such that the cover can be unlatched by actuating the named grounding device.

18 Claims, 5 Drawing Sheets

(51) Int. Cl.
*B60K 6/46* (2007.10)
*B60K 28/12* (2006.01)
*B60L 3/00* (2006.01)
*B60L 3/04* (2006.01)
*B60L 11/02* (2006.01)
*B60K 28/00* (2006.01)
*B60K 28/10* (2006.01)

(52) U.S. Cl.
CPC .................. *B60L 3/00* (2013.01); *B60L 3/04* (2013.01); *B60L 11/02* (2013.01); *B60K 28/10* (2013.01); *B60K 2028/003* (2013.01); *B60K 2028/006* (2013.01); *B60L 2200/40* (2013.01); *B60Y 2200/41* (2013.01); *B60Y 2200/92* (2013.01); *Y02T 10/6217* (2013.01); *Y02T 10/70* (2013.01); *Y02T 10/7077* (2013.01); *Y10S 903/904* (2013.01)

(58) Field of Classification Search
USPC ...................................................... 307/10.1
See application file for complete search history.

(56) References Cited

U.S. PATENT DOCUMENTS

| | | | |
|---|---|---|---|
| 7,950,481 B2 | 5/2011 | Betz et al. | |
| 8,395,335 B2 | 3/2013 | Marchand et al. | |
| 9,051,024 B2 | 6/2015 | Miyagawa et al. | |
| 2015/0129330 A1* | 5/2015 | Hazebayashi | B60L 11/14 180/53.8 |

FOREIGN PATENT DOCUMENTS

| | | |
|---|---|---|
| DE | 10251706 A1 | 6/2003 |
| DE | 60302308 T2 | 7/2006 |
| DE | 202011004166 U1 | 5/2011 |
| DE | 102011004625 A1 | 8/2012 |
| DE | 102012203242 A1 | 9/2012 |
| DE | 102012215653 A1 | 6/2013 |
| EP | 2474433 A1 | 7/2012 |
| EP | 2517921 A2 | 10/2012 |
| JP | 2013055844 A | 3/2013 |

OTHER PUBLICATIONS

Mittelspannungsgerate Auswahl et al: "Trenn-und Erdungsschalter 3D", Dec. 31, 2008 (Dec. 31, 2008), XP055164787,Internet Retrieved from the Internet: URL:https://w3.siemens.com/powerdistribution/global/SiteCollectionDocuments/en/mv/indoor-devices/disconnector-earthing-switches-3d/katalog-3d-trenn-und-erdungsschalter_de.pdf [retrieved on Jan. 26, 2015] p. 9-p. 9 (See NPL 4, International Search Report Issued in Application No. PCT/EP2014/002438 for Explanation of Relevance).

Anonymous: "Sicherheitsbestimmungen and Sicherheitsregeln fur Elektroarbeiten", Jan. 25, 2011 (Jan. 25, 2011), XP055165441,Retrieved from the Internet: URL:http://www.vbg.de/apl/arbhilf/unterw/86_sus.htm [retrieved on Jan. 28, 2015] p. 3-p. 3 (See NPL 4, International Search Report Issued in Application No. PCT/EP2014/002438 for Explanation of Relevance).

"Baureihe GAE1250kMAX", Dec. 31, 2012 (Dec. 31, 2012), XP055165468, Retrieved from the Internet: URL:http://www.ormazabal.com/sites/default/files/ormazabal/productos/descargables/CA_502_DE_1303.pdf [retrieved on Jan. 28, 2015] p. 13-p. 13 (See NPL 4, International Search Report Issued in Application No. PCT/EP2014/002438 for Explanation of Relevance).

ISA European Patent Office, International Search Report Issued in Application No. PCT/EP2014/002438, dated Feb. 5, 2015, WIPO, 6 pages.

* cited by examiner

WORK MACHINE HAVING AN ELECTRIC DRIVE

CROSS REFERENCE TO RELATED APPLICATIONS

The present application is a U.S. National Phase of International Patent Application Ser. No. PCT/EP2014/002438, entitled "Working Machine with Electric Drive, Grounding Device, and Short-Circuiting Device for Intermediate Circuit, "filed on Sep. 9, 2014, which claims priority to German Patent Application No. 10 2013 021 606.0, filed on Dec. 19, 2013, and to German Patent Application No. 10 2013 017 112.1, filed Oct. 15, 2013, the entire contents of each of which are hereby incorporated by reference in their entirety for all purposes.

TECHNICAL FIELD

The present invention relates to a work machine, in particular to a construction machine and/or mining machine such as a crawler-type vehicle, a dump truck, mining device or the like, having an electric drive comprising power electronics which have at least one transformer which has power connections covered by a cover for connecting power cables, wherein a manually actuable grounding device is provided for grounding and/or short-circuiting the transformer and/or an intermediate circuit connected thereto. The invention in this respect in particular also relates to such a transformer.

BACKGROUND AND SUMMARY

With self-propelled work machines such as dump trucks, trucks, bulldozers or self-propelled cutters such as surface miners, snow blowers or asphalt cutters, electric drives having at least one electric motor have been used in recent times to utilize the typical advantages of such electric drives with respect to hydrostatic drives such as their better efficiency and an easier maintenance. Considerably lower operating costs can also be achieved in the partly substantial powers due to the substantially better efficiency. The electric drive can in this respect in particular be utilized as a traction drive by means of which at least one wheel or one chain drive of the undercarriage is driven, but also for driving a main work unit such as the milling cutter of a surface miner.

In this respect a generator can be provided for the power supply of the electric drive and can be driven by an internal combustion engine, for example in the form of a diesel engine, a gasoline engine or a gas engine. The power electronics between the named generator and a respective electric motor with which, for example, a wheel of the chassis or a pinion of a chain drive can be driven, in this respect as a rule comprises two transformers of which one serves as a generator transformer and is associated with the generator and the other serves as a motor transformer and is associated with the electric motor, wherein the two transformers can be connected by a common intermediate circuit, in particular a DC voltage intermediate circuit. The electric motor is supplied from the generator with electric power via the named power electronics, with, optionally with a bidirectional configuration of the power electronics, a feedback of electrical motor braking power to the generator being able to take place which is generated by the electric motor in coasting operation. Such a transformer can be formed, for example, as a frequency inverter or as a DC-DC controller.

Since the use of such diesel-electric drive systems have previously not been widespread in construction machinery or mining machinery such as trucks, dump trucks, crawler-type vehicles and the like, the service personnel present at the machine operators usually only have basic electrical knowledge such that serving and repair work is as a rule only restricted to the replacement of individual components. In this respect, due to the limited technical electrical knowledge of the service personnel, safety problems occasionally occur which may lead to serious danger situations due to the high powers and high voltages.

Considerable residual charges and residual voltages occasionally remain in the electrical drive components of such work machines even if the work machine had already been turned off or switched off for some time. A discharge typically takes place via the braking resistors, which, however, as a rule does not result in a complete discharge and does not exclude the named residual voltages. In this respect, as a rule, the absence of voltage must be checked by electrically trained technical personnel using corresponding measurement devices before work can be carried out at the electrical drive components. In this respect, a grounding of the components is likewise carried out by electrically trained technical personnel using external grounding devices, which, however, exceeds the routine and experience of the normal service personnel of machine operators.

Construction machinery using such diesel electrical drive systems are known, for example, from the documents U.S. Pat. No. 7,950,481 B1 and U.S. Pat. No. 8,395,335 B2.

It is the underlying object of the present invention to provide an improved work machine of the initially named kind which avoids disadvantages of the prior art and further develops the latter in an advantageous manner. A safe replacement of electrical drive components should in particular also be made possible for personnel not trained extensively in electrical work.

In accordance with the invention, the named object is achieved by a work machine having an electric drive comprising power electronics which have at least one transformer and/or an intermediate circuit, and having power connections covered by a cover for connecting power cables, wherein a manually actuable grounding device is provided for grounding of the transformer and/or for short-circuiting of the at least one intermediate circuit, characterized in that wherein the grounding device is coupled to a cover latching for latching the cover such that the cover is unlatched by actuating the grounding device; and by a transformer for a work machine having an electric drive, the transformer having power connections covered by a cover for connecting power cables, wherein a manually actuable grounding device is provided for grounding of the transformer and/or for a short-circuiting of at least one intermediate circuit, wherein the grounding device is coupled to a cover latching for latching the cover such that the cover is unlatched by actuating the grounding device.

It is therefore proposed to configure the transformer such that, on an unlatching of the cover by which the connection regions of the components endangered by residual voltage, the grounding device has to be automatically actuated such that a grounding or absence of voltage is present when the cover can be removed. In accordance with the invention, the manually actuable grounding device is coupled to a cover latch of the cover such that the cover can be unlatched by actuating the named grounding device. The unlatching of the connection regions endangered by residual voltage takes place by the grounding device so that a grounding is ensured before use is made of the named connection regions, for example to release power cables. The replacement of the corresponding component can also be entrusted to technical personnel without particular electrical training thanks to such a grounding with compulsory control.

The induced grounding is in this respect advantageously of an all-pole type. An all-pole type grounding in this respect means the all-pole connection of the active conductors with the protective ground or with the conductive chassis or housing of the system. The all-pole grounding of the intermediate circuit (DC) can be sufficient with converters. The grounding of the alternating current connections (AC) can be provided by free-running diodes of the power semiconductor (IGBT) or diodes of rectifiers of the power electronics. The introduction of electrical energy can hereby be prevented during the replacement of one or more transformers of the system.

In a further development of the invention, the coupling between the grounding device and the cover latch is configured in this respect such that the cover can actually only be opened when the grounding device is in its grounded position. If the grounding device is not in its grounded position or if it was not yet actuated, the cover latching is held in its latching position so that the cover cannot be released. In an alternative further development, it would admittedly likewise be possible to provide an expert unlatching by means of which trained technical personnel can also open the cover, for example, with special tools even with an unactuated grounding device. To avoid an incorrect operation which endangers safety, however, the previously named compulsory coupling between the grounding device and the cover latching can be advantageous which holds the cover latching in the latched position as long as the grounding device has not been actuated and is in an ungrounded position.

The coupling between the grounding device and the cover or its cover latching can be configured mechanically in a further development of the invention. For example, an actuation lever of the grounding device can be connected to a latching part of the cover latch or can itself form the named latching part such that the latching part is always co-moved when the actuation lever of the grounding device is moved. Alternatively or additionally to such a mechanical coupling, the cover latching can also be electrically and/or electromagnetically coupled to the grounding device, for example such that a latching part is electromagnetically brought into the latched position and is held there, for example for so long as a sufficiently high residual voltage is still present in the transformer intermediate circuit, with the latching part then being able to move into the released position, for example by means of a spring device, when the residual voltage has dropped. Such an electrical or electromagnetic control of the cover latching can also work in dependence on the grounding device, for example such that the voltage actuating the electromagnet and thus latching the latching part is interrupted or reduced by the grounding device when the grounding device is brought into its grounded position.

To ensure that the grounding device remains in the grounded position after releasing the cover or during servicing, dismantling or removing of the component, the grounding device can advantageously be latched in the grounded position. For this purpose, a suitable latch element or a lock can be provided which can advantageously be configured as self-latching, for example in the form of a biased snap-in latch which latches when the grounding device has been manually actuated.

In a further development of the invention, locking and/or unlocking means can be associated with the grounding device by means of which the grounding device can only be actuable, i.e. can only be brought into the grounded position, when the residual voltage in the system does not exceed a predefined voltage limit, for example is below a safety extra-low voltage limit. If the residual voltage in the system still exceeds the named voltage limit, the grounding device remains unactuable so that the system cannot be grounded at voltages which are too high.

In a further development of the invention, the transformer can comprise a residual voltage gauge for measuring a residual voltage, wherein the grounding device has an actuation lock for locking the grounding device in the ungrounded position in dependence on the measured residual voltage. The locking of the grounding device can in this respect be effected in the sense of a blocking such that a grounding element cannot be moved into its grounded position. Alternatively or additionally, the lock can also interrupt an actuation train between the manual actuation lever and the grounding part such that an actuation of the actuation element of the grounding device is unsuccessful.

The named residual voltage gauge can advantageously be integrated into the transformer, for example can be implemented by an integrated voltage measurement circuit.

The named residual voltage gauge can advantageously be connected to a residual voltage display for displaying the still remaining residual voltage to indicate to a service mechanic that the residual voltage has still not been sufficiently reduced and/or has already been sufficiently reduced. Such a residual voltage display can, for example, comprise an optical display apparatus at the housing exterior, for example in the form of a color LED.

In order not to have to connect any external discharge device to the transformer, in a further development of the invention, an automatic discharge device can be integrated into the transformer which automatically discharges the transformer or a transformer intermediate circuit, for example every time after switching off the work machine and/or after an absence of a control signal to the transformer, for example when the control cable is removed during servicing. A compulsory controlled, two-stage servicing process can be achieved by such a discharge device which automatically discharges the power electronics or their transformer every time after a turning off of the work machine and/or after inputting a maintenance or service command and/or after removing the control cable until the residual voltage falls below the aforesaid predefined voltage limit. The work machine first has to be turned off and/or the command has to be given that the work machine is in the service mode and/or the control cable has to be removed from the transformer. This causes the named discharge device to automatically discharge the transformer or the intermediate circuit. Only when the discharge process was so successful that the residual voltage gauge determines a sufficiently small residual voltage is the grounding device unlocked so that a service engineer can close the grounding device or can bring it into the grounded position. This, i.e. the actuation of the grounding device, in turn releases the cover latching so that the cover can be released or removed and thus access can be achieved to the connection regions endangered by residual voltage.

The electrical drive system or the electric drive of the work machine can in this respect have a plurality of transformers which can advantageously all be protected in the named manner by a grounding device and/or by a discharge device. For example, the electrical drive system can comprise at least one motor transformer associated with an electric motor and one generator transformer associated with a generator which are connected to one another by a common intermediate circuit to supply the electric motor with electrical energy from the generator in the drive mode and/or to feed motor braking power generated by the electric motor in coasting operation to the generator and optionally to apply it to an internal combustion engine which drives the named generator to generate the electrical current in the drive mode.

A redundancy can be achieved in a common system by the use of two transformers which can each be provided in the named manner with a grounding device and with a discharge device. The other electrical transformer advantageously serves as a system short-circuiting device after removal of an electrical transformer. The grounding of the remaining transformer ensures that the system remains grounded overall even if a transformer has been removed.

Due to the removal of at least one transformer from the system, the release for the start of the internal combustion engine can be latched such that a restart of the internal combustion engine is suppressed and is only present again after reinstallation of all the transformers. The introduction of electrical energy can hereby be prevented during the replacement of one or more transformers of the system.

The internal combustion engine start latch can be formed, for example, in the form of an electrical unlocking chain analog to an emergency stop chain. Before the removal of at least one transformer, inter alia all the electrical connections thereto should be separated. The unlocking chain is hereby separated and the electrical circuit to the starter device of the internal combustion engine is, for example, interrupted. Only after the reinstallation and connection of all the transformers of the system is the unlocking for starting the internal combustion engine present again.

The invention will be explained in more detail in the following with reference to a preferred embodiment and to associated FIGURES.

DETAILED DESCRIPTION

Figure 1:
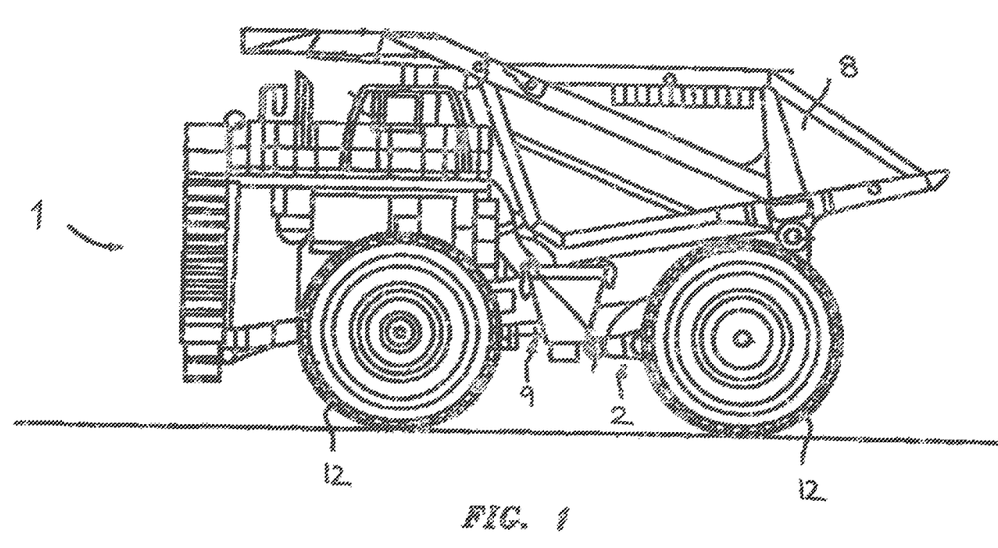
FIG. 1 shows a schematic side view of a work machine in the form of a truck which can be configured as a dump truck.

As FIG. 1 shows, the self-propelled work machine 1 can be configured, for example, as a truck, in particular in the form of a dump truck, and can comprise as an undercarriage 2 a plurality of wheels 12 which are distributed over a plurality of axles and which support the chassis or the frame of the work machine 1. It is, however, understood that the work machine can also be configured in another form, for example as a bulldozer having a tracked undercarriage or in the form of another construction machine or mining machine having a wheel undercarriage or chain undercarriage.

The drive systems of the work machine 1 comprise at least one electric drive 3 having at least one electric motor 4 which can serve as a traction drive and which can drive the wheels 12. In this respect, one electric motor 4 can simultaneously drive a plurality of wheels 12, for example the wheels 12 of an axle, optionally via a power-split transmission or a differential. Alternatively, a single wheel drive can also be provided in which a separate electric motor is associated with each driven wheel 12.

Figure 2:
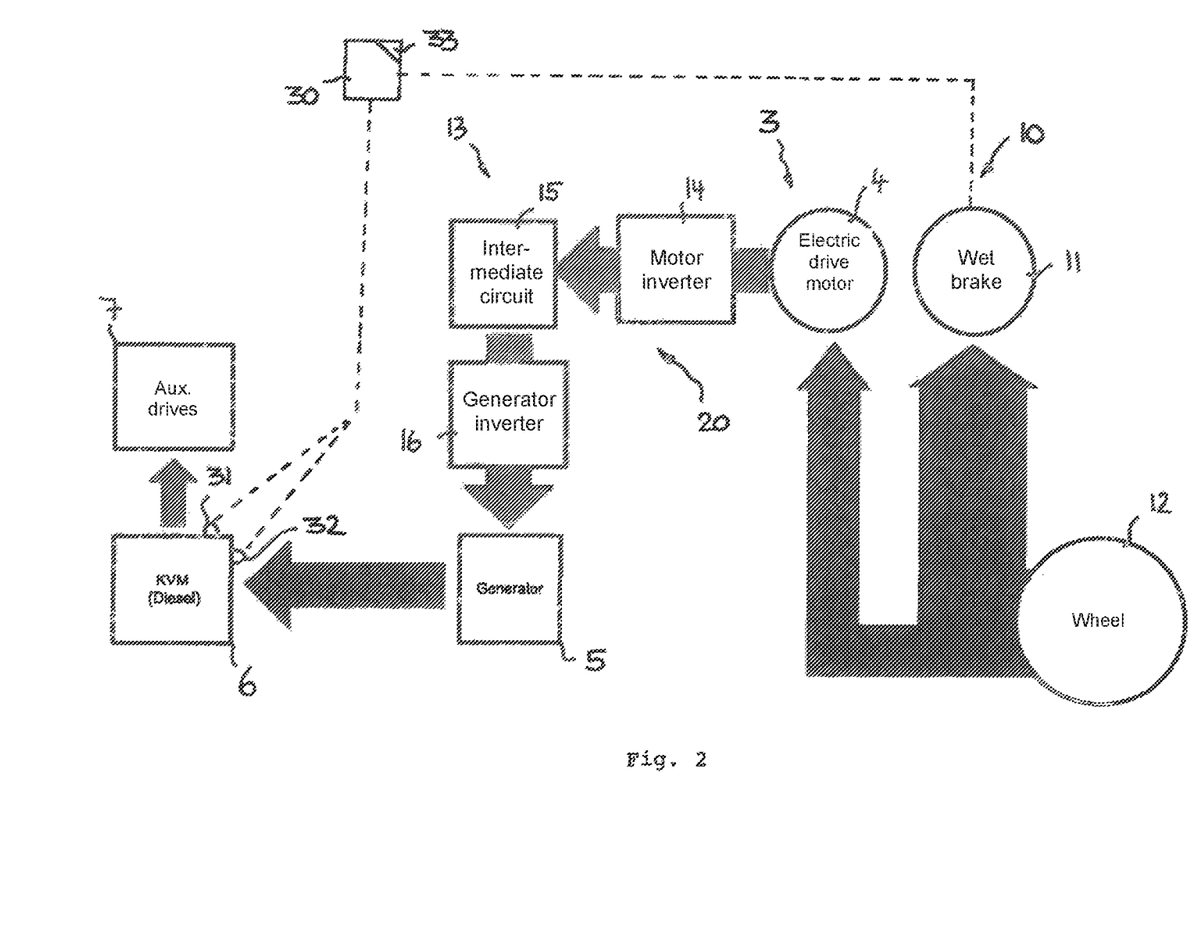
FIG. 2 shows a schematic representation of the electrical drive system of the work machine of FIG. 1.

As FIG. 2 shows, the electric drive 3 is supplied with electric current from a generator 5, with the named generator 5 being driven from an internal combustion engine 6 which can be formed, for example, as a diesel engine or as a gasoline engine or also as a gas engine. The at least one electric motor 4 or the optional plurality of electric motors 4 is/are in this respect connected to the generator 5 via power electronics 13 which can comprise a motor inverter 14 associated with the respective electric motor 14 and a generator transformer 16 associated with the generator 5, with an intermediate circuit 15, in particular in the form of a DC voltage intermediate circuit, being able to be provided between the motor transformer 14 and the generator transformer 16, cf. FIG. 2. The generator transformer 16, the intermediate circuit 15 and the motor transformer 14 are in this respect advantageously configured as working bidirectionally to be able to transfer power produced by the generator 5 onto the electric motor 4 in the drive mode in which the generator 5 is driven by the internal combustion engine 6 and to be able to feed back current produced by the electric motor 4 in braking operation in the reverse direction to the generator 5, as will still be explained. The named transformers 14 and 16 can be frequency inverters or, for example, also DC-DC controllers and can have an intermediate circuit and an energy store 27, cf. FIG. 3.

The work machine 1 can furthermore comprise at least one auxiliary drive 7 which can likewise be driven by the named internal combustion engine 6. The named auxiliary drive 7 can, for example, be a hydraulic unit or a hydraulic drive which can comprise a hydraulic pump driven by the named internal combustion engine 6 to be able to hydraulically drive corresponding auxiliary units. For example, an auxiliary drive 7 can serve for adjusting the loading trough 8 of the dump truck shown in FIG. 1 and can comprise for this purpose at least one adjustment actuator, for example in the form of a hydraulic actuator such as a hydraulic cylinder to be able to tilt up the loading trough 8 for unloading.

The named auxiliary drives can, however, also comprise still further auxiliary units such as cooling units, fans, steering assistance systems and the like.

Figure 3:
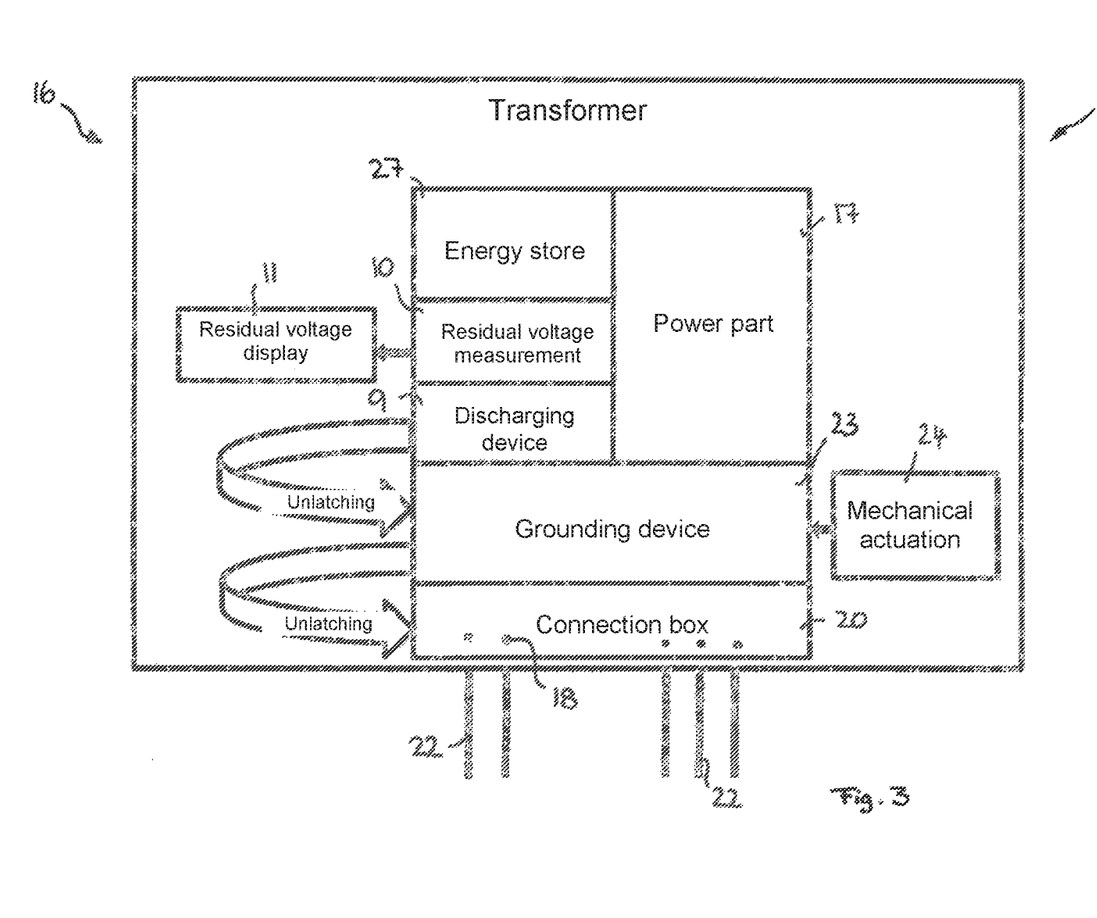
FIG. 3 shows a schematic representation of one of the transformers of the electrical drive system of the work machine from the preceding FIGS. which shows the discharging and grounding devices integrated into the transformer and the connection box which is unlatchable by the grounding device and in which the power cables can be connected.

As FIG. 3 shows, at least one or each of the aforesaid motor and generator transformers 14, 16 can comprise in a manner known per se a power part 17 which can have the typical power electronic components for transforming the voltage to be transferred. Power cables 22 can be connected to the respective transformer or transformers via power connections 18 which can be received in a connection box 20 and which can be covered by a cover 21, cf. FIG. 4.

To be able to reduce residual voltages still applied to the transformer or to the transformer intermediate circuit after switching off the machine without an external discharging device having to be connected for this purpose, a discharging device 9 is advantageously integrated into the transformer and can be connected to the named power part 17 and can, for example, have discharge resistors to reduce residual voltages in a dissipating manner or to convert them into heat. The discharge device 9 in this respect also discharges the aforesaid energy store 27 of the transformer.

To display the residual voltage still present in the system to a service mechanic, a residual voltage gauge 10 is advantageously furthermore integrated into the named transformer and can have a suitable measurement circuit to be able to determine the named residual voltage. The named residual voltage gauge 10 is advantageously connected to a residual voltage display 11 attached to an outer housing side to indicate the still present residual voltage to the service mechanic, for example in the form of a light signal or of a digital, numerical display.

To be able to ground the transformer or the intermediate circuit before the connection box 20 is opened and work is carried out at the connections, a grounding device 23 is furthermore advantageously integrated into the transformer, with the named grounding device being able to be received, for example, in the interior of a common housing together with the discharge device 9.

The grounding device 23 can advantageously be mechanically actuated, for example via an actuation lever 24 or via an actuation element configured in a suitable manner, for example in the form of a button at the housing exterior.

The named grounding device 23 is in this respect advantageously secured against actuation as long as the residual voltage in the system is still above a predefined measure. For example, a mechanical latching of the named actuation lever 24 of the grounding device 23 can be provided, wherein the named mechanical latching can be controlled by the discharging device 9 and/or by the residual voltage gauge 10 such that the mechanical latching is only released when the residual voltage has fallen below a predefined measure and/or when the discharge device 9 has been actuated, optionally over a sufficiently long time.

Figure 4:
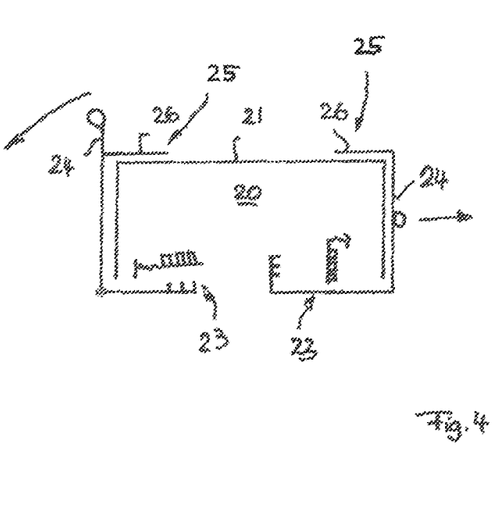
FIG. 4 shows a schematic representation of the coupling between the grounding device and the latching of the cover by which the connections are covered in the connection box of the transformer of FIG. 3.

The grounding device 23 is in turn advantageously coupled to the cover 21 of the connection box 20 or to a cover latching 25 by which the connection box or its cover 21 can be latched. The named cover latching 25 can be arranged disposed inwardly in an advantageous further development of the invention or can be accommodated in the interior of the connection box 20. Alternatively or additionally, a self-latching configuration of the cover latching 25 can also be provided, for example by means of a bias device, which automatically closes or latches the named cover latching when the cover is placed on or when the connection box 20 is closed.

The grounding device 23 is in this respect advantageously coupled to the named cover latching 25 such that the cover 21 can only be removed or the connection box 20 can only be opened when the grounding device 23 has been actuated and is located in its grounded position. For example, for this purpose, the actuation lever 24 of the grounding device 23 can be connected in an articulated manner or rigidly to a latching part of the cover latching 25 such that the named latching part is co-moved when the actuation lever 24 is actuated, as FIG. 4 shows. For example, the actuation lever 24 can be configured as a pivot lever and can comprise a latching part 26 which can be pushed over the cover 21 and which is released from the cover 21 when the actuation lever 24 is actuated, as the left hand side of FIG. 4 shows. Alternatively or additionally, the actuating lever 23 can also be supported in a translatorily displaceable manner, for example in the manner of a sliding switch, and can support the latching part 26 so that the cover 21 can be unlatched by displacing the actuation lever 24, as the right hand side of FIG. 4 shows.

Figure 5:
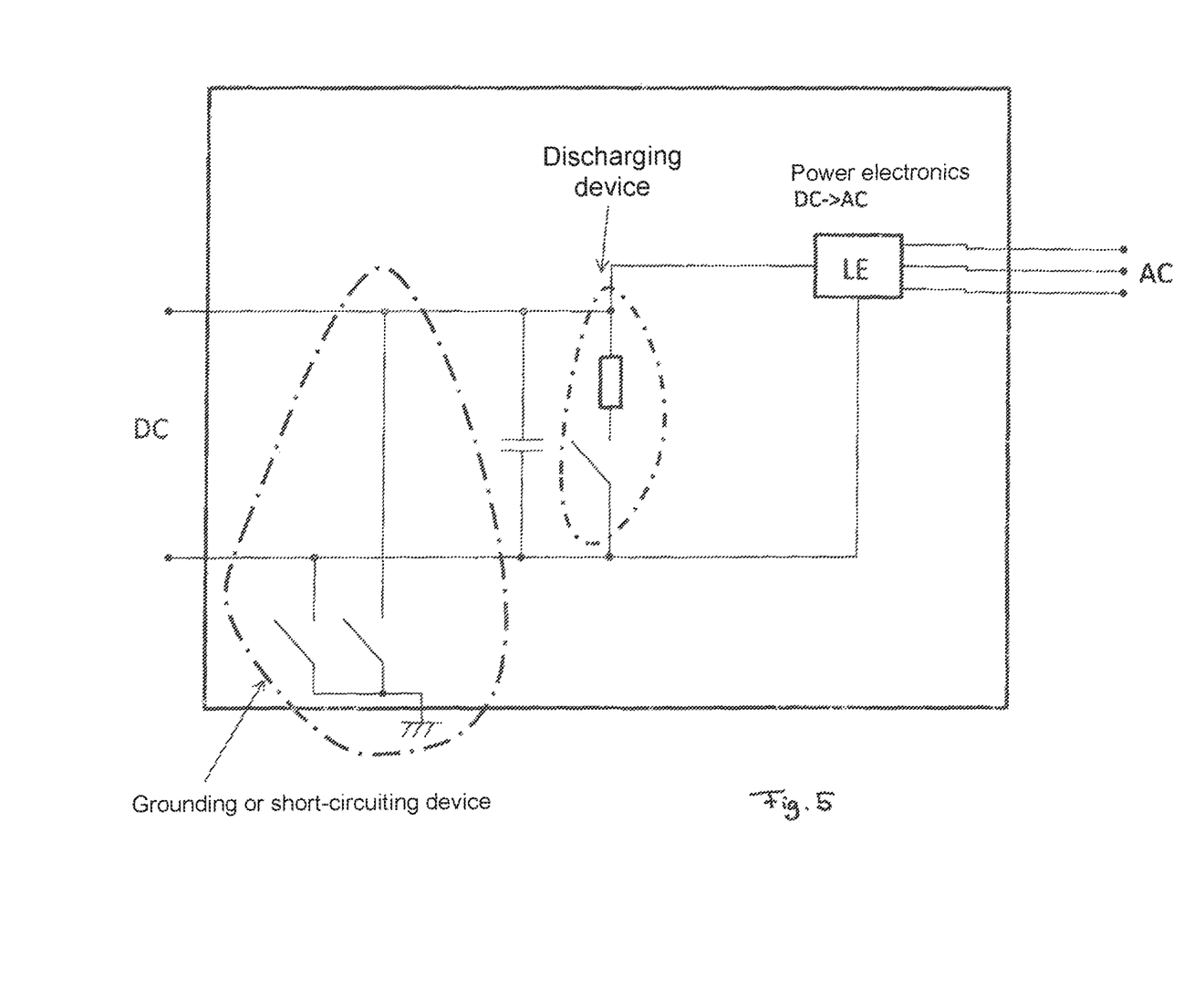
FIG. 5 shows a schematic representation of a grounding or short-circuiting device in accordance with an embodiment of the invention.

FIG. 5 furthermore shows by way of example an embodiment of the grounding and short-circuiting device 23 for the all-pole grounding of the transformer or for the short-circuiting of the intermediate circuit. With a wheel-driven work machine such as a truck, the grounding can in this respect take place to the chassis mass which in this respect serves as a "ground", with the grounding in particular also being able to take place to the "real" ground in other applications.

The invention claimed is:

1. A work machine having an electric drive comprising power electronics which have at least one transformer and/or an intermediate circuit, and having power connections covered by a cover for connecting power cables, wherein a manually actuable grounding device is provided for grounding of the at least one transformer and/or for short-circuiting of the at least one intermediate circuit, wherein the grounding device is coupled to a cover latching for latching the cover such that the cover is unlatched by actuating the grounding device;

wherein the at least one transformer comprises a residual voltage gauge for measuring a residual voltage that is applied to the at least one transformer or to the transformer intermediate circuit, wherein the grounding device comprises an actuation lock for locking the grounding device in an undergrounded and/or non-short-circuited position in dependence on the measured residual voltage, wherein the actuation lock can only be released, or is automatically released, when the residual voltage measured by the residual voltage gauge is smaller than a predefined voltage limit.

2. The work machine in accordance with claim 1, wherein the cover latching is compulsorily coupled to the grounding device such that the cover is openable only when the grounding device is in a grounded and/or short-circuited position; wherein the work machine is a construction machine and/or a mining machine, wherein the grounding is an all-pole grounding.

3. The work machine in accordance with claim 2, wherein the grounding device has a latching device for latching the grounding device in the grounded and/or short-circuited position.

4. The work machine in accordance with claim 2, wherein the grounding device is integrated into the at least one transformer such that only one actuation element of the grounding device is accessible from an outer side of the transformer.

5. The work machine in accordance with claim 4, wherein the construction machine or the mining machine is a crawler-type vehicle, a truck or a dump truck; wherein the grounding device is arranged in an interior of a housing of the at least one transformer.

6. The work machine in accordance with claim 1, wherein an actuation lever of the grounding device is mechanically compulsorily coupled to a latching part of the cover latching.

7. The work machine in accordance with claim 1, wherein the residual voltage gauge is connectable to a residual voltage display for displaying the measured residual voltage.

8. The work machine in accordance with claim 1, wherein the at least one transformer has an integrated discharge device for discharging the at least one transformer and/or the intermediate circuit.

9. The work machine in accordance with claim 8, wherein the discharge device is actuable by interrupting or removing a control line for controlling the at least one transformer.

10. The work machine in accordance with claim 8, wherein the at least one transformer is at least two transformers connected to one another by a common intermediate circuit, wherein each of the at least two transformers has the grounding device and the integrated discharging device such that the intermediate circuit is also grounded overall by a second grounded and/or short-circuited transformer after a removal of a first transformer.

11. The work machine in accordance with claim 1, wherein the at least one transformer is a motor transformer associated with an electric motor of the electric drive.

12. The work machine in accordance with claim 1, wherein the at least one transformer is a generator transformer associated with a generator of the electric drive.

13. The work machine in accordance with claim 1, wherein an internal combustion engine is provided for driving a generator for supplying the electric drive with electrical energy.

14. The work machine in accordance with claim 13, wherein a start latching device is automatically actuated by removal of the at least one transformer from its installation position such that the internal combustion engine cannot be started.

15. The work machine in accordance with claim 14, wherein the removal of the at least one transformer from its installation position is only possible when the start latching device is manually actuated such that the internal combustion engine cannot be started.

16. A transformer for a work machine having an electric drive, the transformer having power connections covered by a cover for connecting power cables, wherein a manually actuable grounding device is provided for grounding of the transformer and/or for a short-circuiting of at least one intermediate circuit, wherein the grounding device is coupled to a cover latching for latching the cover such that the cover is unlatched by actuating the grounding device;
wherein the transformer comprises a residual voltage gauge for measuring a residual voltage that is applied to the transformer or to the transformer intermediate circuit, wherein the grounding device comprises an actuation lock for locking the grounding device in an ungrounded and/or non-short-circuited position in dependence on the measured residual voltage, wherein the actuation lock can only be released, or is automatically released, when the residual voltage measured by the residual voltage gauge is smaller than a predefined voltage limit.

17. The transformer in accordance with claim 16, wherein an integrated discharging device is provided for discharging the transformer, and the grounding device is only actuable after actuation of the discharging device and/or only when a present residual voltage is smaller than the predefined voltage limit.

18. The transformer in accordance with claim 17, wherein the grounding is an all-pole grounding; wherein the integrated discharging device is an energy store.

* * * * *